Patented May 10, 1927.

1,627,952

UNITED STATES PATENT OFFICE.

HARRY E. BROOKBY, OF EVANSTON, ILLINOIS, ASSIGNOR TO UNITED STATES GYPSUM COMPANY, OF CHICAGO, ILLINOIS, A CORPORATION OF ILLINOIS.

PLASTIC CEMENTITIOUS MATERIAL.

No Drawing.     Application filed August 8, 1923.  Serial No. 656,455.

This invention relates to improvements in plastic material and more particularly to the production of plastic cementitious material for use as a mortar, stucco or plaster.

It is an object of this invention to provide a cement mortar that will possess sufficient adhesive and, at the same time, spreading qualities to make it advantageous for interior plastering and exterior stucco plastering in the erection of houses and other buildings.

Portland cement, natural hydraulic cement and other cementitious substances are not practical as mortar bases for this character of application on account of the lack of plasticity or spreading qualities under the mechanics' tools as well as the lack of adhesion, and such mortars are termed in the trade as "short working." Such materials have been made adaptable for these uses by the addition of lime putty or hydrated lime in varying proportions as the mortar is being mixed but to be practicable it requires such a large proportion of the lime addition to secure spreading properties for satisfactory and economical application by a mechanic that the strength of the resultant cement mortar is lessened to such a degree that the finished structural value is markedly weakened.

It is the purpose of this invention to impart the necessarily desired plastic spreading and adhesive qualities to such cementitious substances by incorporating a small percentage of finely divided hydrated lime and a small percentage of finely divided, highly plastic clay, such as plastic kaolin, china clay, or any other plastic substance that is "flocculated" by lime in the molecular concentration that the small percentage of lime would occasion in the cement mortar. When such clays are "flocculated" they contract, shrink and, at the same time, necessarily develop more density and increased internal adhesion so that when this reaction takes place in the cement mortar a remarkable increase in the internal cohesion of the mortar, when mixed, takes place, resulting in the mortar becoming plastic and easily spread. As a result this cement mortar will carry about three parts of sand and maintain sufficient plasticity and adhesion to be applied by workmen as a plastering base for interior walls or an outside stucco plaster without undue physical effort on their part.

In carrying out this invention, commercial hydraulic cement is placed in a blending or mixing apparatus of any desired type together with the predetermined percentage of finely ground clay and hydrated lime, blended together to a homogeneous mixture and sacked for the market. The amounts of clay and lime to be added depend upon the plasticity to be imparted and the final strength of the mortar that must be maintained. It has been determined that the proportions of six pounds of finely powdered plastic clay, high in colloidal clay substance, and six pounds of hydrated lime mixed with eighty-eight pounds of hydraulic cement produce a plastic product capable of making a good cohesive wet mortar with three parts of sand and still maintain the approximate structural value of cement mortar without such additions. If desired, the constituent materials of this improved product may be ground together, and may be advantageous at times, depending upon the fineness of the hydraulic cement and the economical handling of the clay and lime used in the mixture. When the materials are ground together it has been found that the addition of a fine gritty substance such as silica sand or hard limestone will assist the reducing of coarser cement particles to more of a flour state with a higher percentage of ultra-fine particles and produce a more desirable product without affecting the desired qualities of the cement mortar so formed.

This improved product may be produced and marketed neat or the usual aggregates may be added before sacking so that it may be marketed in the same manner as the various stucco and plaster bases are now marketed. When an architect specifies a cement mortar of definite strength the strength of such mortar is actually assured in the mortar produced in accordance with this invention, likewise stucco and plaster of definite specified strength are produced, as plasticity and spreading qualities are imparted to the cement without the heretofore loss in structural value. And by this invention the definite structural value specified in the cement is maintained throughout the mixing, application and setting of this improved mortar, stucco or plaster.

What I claim is:

1. A plastic cementitious material comprising substantially eighty-eight parts by weight of hydraulic cement, six parts of finely divided plastic clay and six parts of finely divided hydrated lime.

2. A plastic cementitious material comprising a mixture of hydraulic cement with finely divided plastic clay and finely divided hydrated lime, the clay and lime not in excess of fifteen percent by weight.

3. A plastic cementitious material comprising ground together hydraulic cement, plastic clay and hydrated lime.

4. The process for producing a plastic cementitious material comprising the grinding together of dry hydraulic cement, plastic clay, hydrated lime and a gritty substance to reduce the ingredients of the mixture to a finely divided state.

HARRY E. BROOKBY.